United States Patent
Koga et al.

(10) Patent No.: US 11,127,940 B2
(45) Date of Patent: Sep. 21, 2021

(54) POSITIVE ELECTRODE ACTIVE MATERIAL PARTICLE POWDER FOR NON-AQUEOUS ELECTROLYTE SECONDARY BATTERY, METHOD FOR PRODUCING SAME, AND NON-AQUEOUS ELECTROLYTE SECONDARY BATTERY

(71) Applicant: TODA KOGYO CORP., Hiroshima (JP)

(72) Inventors: Kazumichi Koga, Yamaguchi (JP); Hiroaki Masukuni, Yamaguchi (JP); Kazutoshi Matsumoto, Chiba (JP)

(73) Assignee: TODA KOGYO CORP., Hiroshima (JP)

( * ) Notice: Subject to any disclaimer, the term of this patent is extended or adjusted under 35 U.S.C. 154(b) by 0 days.

(21) Appl. No.: 16/712,161

(22) Filed: Dec. 12, 2019

(65) Prior Publication Data

US 2020/0119332 A1 Apr. 16, 2020

Related U.S. Application Data

(62) Division of application No. 15/527,417, filed as application No. PCT/JP2015/082692 on Nov. 20, 2015, now Pat. No. 10,547,047.

(30) Foreign Application Priority Data

Nov. 20, 2014 (JP) ................................ 2014-235887

(51) Int. Cl.
| | | |
|---|---|---|
| *H01M 4/131* | (2010.01) | |
| *H01M 4/04* | (2006.01) | |
| *H01M 4/1391* | (2010.01) | |
| *H01M 4/505* | (2010.01) | |
| *C01G 45/12* | (2006.01) | |
| *H01M 10/0525* | (2010.01) | |
| *H01M 4/02* | (2006.01) | |

(52) U.S. Cl.
CPC ........ *H01M 4/131* (2013.01); *C01G 45/1242* (2013.01); *H01M 4/0471* (2013.01); *H01M 4/1391* (2013.01); *H01M 4/505* (2013.01); *H01M 10/0525* (2013.01); *C01P 2002/32* (2013.01); *C01P 2002/72* (2013.01); *C01P 2004/03* (2013.01); *C01P 2004/41* (2013.01); *C01P 2004/61* (2013.01); *C01P 2006/12* (2013.01); *H01M 2004/028* (2013.01)

(58) Field of Classification Search
CPC .... H01M 4/131; H01M 4/505; H01M 4/0471; H01M 4/1391; H01M 10/0525; H01M 2004/028; H01M 10/052; C01G 45/1242; C01P 2002/72; C01P 2004/03; C01P 2004/61; C01P 2004/41; C01P 2006/12; C01P 2002/32; C01P 2004/50; C01P 2004/62; C01P 2004/64; C01P 2006/40; Y02E 60/122

See application file for complete search history.

(56) References Cited

U.S. PATENT DOCUMENTS

| | | | |
|---|---|---|---|
| 4,977,112 A * | 12/1990 | Matsui | .................. C04B 35/584 264/122 |
| 6,168,888 B1 | 1/2001 | Iwata et al. | |
| 2002/0009645 A1 | 1/2002 | Shima et al. | |
| 2002/0106566 A1 | 8/2002 | Nemoto et al. | |
| 2009/0104530 A1 | 4/2009 | Shizuka et al. | |
| 2010/0187197 A1* | 7/2010 | Yamamoto | ............. G11B 5/855 216/22 |
| 2010/0207059 A1 | 8/2010 | Uegami et al. | |
| 2010/0327221 A1 | 12/2010 | Koga et al. | |
| 2011/0003205 A1 | 1/2011 | Yura et al. | |
| 2011/0297876 A1* | 12/2011 | Masukuni | .......... C01G 45/1242 252/182.1 |
| 2012/0270107 A1 | 10/2012 | Toya et al. | |
| 2014/0114519 A1 | 4/2014 | Iwama et al. | |
| 2014/0127582 A1 | 5/2014 | Nagai | |
| 2016/0126547 A1* | 5/2016 | Koga | ................. C01G 45/1214 429/224 |

FOREIGN PATENT DOCUMENTS

| | | |
|---|---|---|
| CN | 102459087 | 5/2012 |
| CN | 102725232 A | 10/2012 |
| CN | 203415648 | 1/2014 |
| CN | 103563139 A | 2/2014 |
| CN | 103779542 A | 5/2014 |

(Continued)

OTHER PUBLICATIONS

International Search Report issued with respect to Application No. PCT/JP2015/082692, dated Feb. 23, 2016.
International Preliminary Report on Patentability issued with respect to Application No. PCT/JP2015/082692, dated May 23, 2017.
S.-H. Park et al., "Mo[sup 6+]-Doped Li [Ni [sub (0.5+x)]Mn[sub(1.5-2x)]Mo[sub x]]O[sub 4] Spinel Materials for 5 V Lithium Secondary Batteries Prepared by Ultrasonic Spray Pyrolysis", Electrochemical and Solio-State Letters., vol. 7, No. 11, Jan. 1, 2004 (Jan. 1, 2004), p. A451, XP055481116, US ISSN: 1099-0062, DOI:10.1149/1.1808114* Sections "Experimental" 1, Results and Discussion, figure 3*.

(Continued)

*Primary Examiner* — Muhammad S Siddiquee
(74) *Attorney, Agent, or Firm* — Greenblum & Bernstein, P.L.C.

(57) ABSTRACT

Positive electrode active material particle powder includes lithium manganese oxide particle powder having Li and Mn as main components and a cubic spinel structure with an Fd-3m space group. The lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape in which each (111) plane thereof is adjacent to at least one (100) plane thereof.

6 Claims, 8 Drawing Sheets

(56) References Cited

FOREIGN PATENT DOCUMENTS

| EP | 2 381 515 | | 10/2011 |
|---|---|---|---|
| EP | 2477258 | A1 | 7/2012 |
| JP | H11-071115 | A | 3/1999 |
| JP | 2000-030707 | A | 1/2000 |
| JP | 2001-052703 | A | 2/2001 |
| JP | 2002-145617 | A | 5/2002 |
| JP | 3375898 | B2 | 2/2003 |
| JP | 4114314 | B2 | 7/2008 |
| JP | 2008-305777 | A | 12/2008 |
| JP | 2009-176732 | A | 8/2009 |
| JP | 2010-192428 | A | 9/2010 |
| JP | 2010-212261 | A | 9/2010 |
| JP | 5344111 | B2 | 11/2013 |
| JP | 5435278 | B2 | 3/2014 |

OTHER PUBLICATIONS

Kang Y J et al., Structural and electrochemical study of Li—Al—Mn—O—F spinel material for lithium secondary batteries, Journal of Power Sources, Elsevier SA, CH, vol. 146, No. 1-2, Aug. 26, 2005 (Aug. 26, 2005), pp. 237-240, XPD27756422, ISSN: D378 • 7753 [retrieved on Aug. 26, 2005] * Sections "2. Experimental", 3. Results and Discussion, figure 3*.

Zhangl et al: Carbon combustion synthesis of LiNi0.5Mn1.5O4 and its use a cathode material for lithium ion batteries, Journal of Alloys and Compounds, Elsevier Sequoia, Lausanne, CH, vol. 480, No. 2, Jul. 8, 2009 (Jul. 8, 2009) pp. 802-805, XPD26169529, ISSN: 0925-8388, DOI:10.1016/J.JALLCOM.2009.02.092 [Retreived on Mar. 3, 2009]* Sections "2. Experimental"3, Results and Discussion, figure 2*.

European Search Report issued with respect to Application No. 15861564.1, dated Jun. 18, 2018.

* cited by examiner

POSITIVE ELECTRODE ACTIVE MATERIAL PARTICLE POWDER FOR NON-AQUEOUS ELECTROLYTE SECONDARY BATTERY, METHOD FOR PRODUCING SAME, AND NON-AQUEOUS ELECTROLYTE SECONDARY BATTERY

CROSS-REFERENCE TO RELATED APPLICATIONS

This is a Divisional application of U.S. patent application Ser. No. 15/527,417, filed May 17, 2017, which is a National Phase application of International Application No. PCT/JP2015/082692, filed on Nov. 20, 2015, which claims the benefit of Japanese Patent Application No. 2014-235887, filed on Nov. 20, 2014. The disclosure of each of these applications is herein incorporated by reference in its entirety.

TECHNICAL FIELD

The present invention relates to positive electrode active material particle powder for non-aqueous electrolyte secondary batteries, methods for producing same, and non-aqueous electrolyte secondary batteries.

BACKGROUND ART

With the spread of mobile devices in recent years, secondary batteries are being widely used. Among them, lithium ion secondary batteries, which are characterized by high charging/discharging voltage and large charging/discharging capacity, have attracted attention.

Conventionally, as positive electrode active material in a 4 V class high energy lithium ion secondary battery, spinel type structure $LiMn_2O_4$, layered rock salt type structure $LiCoO_2$, $LiCo_{1-x}Ni_xO_2$, $LiNiO_2$, and the like are generally known. Among these, $LiCoO_2$ excels in that it has a high voltage and high capacity, but the supply amount of cobalt material is small, leading to increased production cost, and there is also a problem from the viewpoint of environmental safety of waste batteries after use.

On the other hand, research into spinel structure lithium manganese oxide (basic composition: $LiMn_2O_4$) is thriving, because a large supply amount can suppress increases in cost, and manganese having good environmental suitability is used. Further, in a layered rock salt type structure of positive electrode active material, diffusion paths of Li are two-dimensional, whereas in a spinel structure of positive electrode active material, diffusion paths of Li are three-dimensional, which is of interest in positive electrode active material for secondary batteries, particularly for vehicular applications and stationary applications.

Here, when high crystallinity is developed in order to obtain high battery performance, obtained lithium manganese oxide particles have an octahedral structure that is the idiomorphic form of a cubic spinel structure, and dissolution of Mn is likely to occur. Further, in a secondary battery using such a positive electrode active material, problems occur such as inferior charge/discharge cycle properties and storage properties at high temperatures.

Varied research and development (Patent Literature 1-5) has been undertaken to solve the problems of non-aqueous electrolyte secondary batteries using such lithium manganese oxide spinel structure positive electrode active material.

CITATION LIST

Patent Literature

[Patent Literature 1] Japanese patent 4114314
[Patent Literature 2] Japanese patent 3375898
[Patent Literature 3] Patent application publication JP 2002-145617
[Patent Literature 4] Japanese patent 5344111
[Patent Literature 5] Japanese patent 5435278

SUMMARY OF INVENTION

Technical Problem

However, conventional technology, including the technology proposed in Patent Literature 1 to 5, cannot be said to be sufficient for constituting a non-aqueous electrolyte secondary battery that excels in high temperature performance.

The present invention has been achieved in view of such problems, and an aim thereof is to provide positive electrode active material particle powder for a non-aqueous electrolyte secondary battery, a method for producing same, and a non-aqueous electrolyte secondary battery, which excel in high temperature performance.

Solution to Problem

Positive electrode active material particle powder for a non-aqueous electrolyte secondary battery pertaining to one aspect of the present invention is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape in which each (111) plane thereof is adjacent to at least one (100) plane thereof.

Advantageous Effects of Invention

The positive electrode active material particle powder for a non-aqueous electrolyte secondary battery pertaining to the above aspect excels in high temperature properties. Thus, it is suitable as a positive electrode active material of a non-aqueous electrolyte secondary battery that has excellent charge/discharge cycle properties and storage properties at high temperatures.

EMBODIMENT

[Developments Leading to Present Invention]

In the course of arriving at the present invention, the inventors conducted the following investigation.

(1) Mn Dissolution and High Temperature Properties Under High Temperature Environment Degradation of charge/discharge cycle properties and storage properties under a high temperature environment is attributable to: (i) deterioration of crystal lattice due to desorption/insertion behavior of lithium ions in the crystal structure of positive electrode active material accompanying repetition of charging/discharging, which expands and contracts crystal volume, destroying the crystal lattice; (ii) instability of crystals in a state when lithium of lithium manganese oxide is halfway charged in a certain charged state; (iii) deterioration of current collection of an electrode; (iv) occurrence of Mn dissolution in electrolytic solution; and the like. Here, Mn dissolution is considered to be caused by a disproportionation reaction as shown below.

$2Mn^{3+}(spinel) \rightarrow Mn^{4+}(spinel) + Mn^{2+}$ (in electrolytic solution)

(2) Suppression of Crystal Plane and Mn Dissolution

The inventors considered that dissolution of Mn is more likely to occur in a crystal structure having sharp edges and apexes such as an octahedral shape, since Mn dissolution occurs more frequently at high curvature locations in particles. Therefore, in order to suppress dissolution of Mn, the inventors found that it is important that crystal planes adjacent to a (111) plane are adjacent to crystal planes other than a (111) plane, in order to reduce curvature and apex of a ridge formed by crystal planes in primary particles.

Further, they found that degree of Mn dissolution varies depending on a difference in crystal planes exposed on particle surfaces. That is, they found that (100) planes and (110) planes can suppress Mn dissolution more than (111) planes.

Note that in this description and claims, the term "(111) plane" includes any planes equivalent to a (111) plane. That is, eight planes including a (−111) plane, a (1-11) plane, and a (11-1) plane.

"(100) plane" also means any planes equivalent to a (100) plane. That is, six planes including a (010) plane, a (001) plane, and a (−100) plane. Further, "(110) plane" also means any planes equivalent to a (110) plane. That is, twelve planes including a (101) plane, a (011) plane, and a (−110) plane.

In description of crystal planes, "−1" is supposed to be written so the "−" is a bar above the "1", but in the present description, "−1" is written for convenience.

In the following description, unless otherwise specified, when describing a (100) plane, a (110) plane, a (111) plane, or the like, equivalent planes are intended to be included.

(3) Measures to Reduce (111) Planes

The reason a cubic manganese spinel crystal is likely to form the idiomorphic octahedral shape composed of (111) planes and planes equivalent thereto is considered to be because the crystal plane growth rate of a (111) plane is lower than that of other crystal planes (for example, (100) plane, (110) plane, and (221) plane). Conversely, since the crystal plane growth rates of (100) planes and (110) planes are greater than that of (111) planes, growth of crystal planes other than (111) planes is promoted in the process of crystal growth, and as a result, these crystal planes disappear.

Accordingly, it was found that if it is possible to lower crystal plane growth rate of planes other than (111) planes, in particular (100) planes and (110) planes, and to suppress growth of crystal planes, a crystal having these planes can be obtained.

Aspects of the Present Invention

The positive electrode active material particle powder for a non-aqueous electrolyte secondary battery pertaining to one aspect of the present invention is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape in which each (111) plane thereof is adjacent to at least one (100) plane thereof.

In the above embodiment, "a polyhedral shape in which each (111) plane thereof is adjacent to at least one (100) plane thereof" indicates a polyhedral shape in which ridges are formed by flat crystal planes abutting each other. Here, "ridges" may overlap in a way that crystal planes are known.

Positive electrode active material particle powder for a non-aqueous electrolyte secondary battery pertaining to another example is configured so that one or more metal elements other than Mn are substituted at an Mn(16d) site, and when Me denotes a metal element other than Li among the one or more metal elements, an [Li/(Mn+Me)] ratio is from 0.5 to 0.65.

Further, positive electrode active material particle powder for a non-aqueous electrolyte secondary battery pertaining to another example is configured so that, in X-ray diffraction analysis, a cubic spinel phase based on Li and Mn, and a phase of one or more other compounds are present.

Further, a non-aqueous electrolyte secondary battery pertaining to another aspect of the present invention comprises: a positive electrode element that includes the positive electrode active material particle powder pertaining to any one of the examples described above.

Further, a method of producing positive electrode active material particle powder for a non-aqueous electrolyte secondary battery pertaining to another aspect of the present invention is a method comprising: mixing trimanganese tetroxide, a lithium compound, and a crystal plane growth suppressor to form a mixture, and firing the mixture in an oxidizing atmosphere at a temperature from 700° C. to 950° C.

The method of producing positive electrode active material particle powder for a non-aqueous electrolyte secondary battery pertaining to another example is configured so that the trimanganese tetroxide is composed of secondary particles, which are aggregates of primary particles, an average particle diameter (D50) of the secondary particles being from 3 μm to 20 μm, and crystallite size of the primary particles being from 50 nm to 150 nm.

Further, the method of producing positive electrode active material particle powder for a non-aqueous electrolyte secondary battery pertaining to another example is configured so that the crystal plane growth suppressor is a niobium compound. Note that substances other than a niobium compound are not excluded as the crystal plane growth suppressor.

Further, the method of producing positive electrode active material particle powder for a non-aqueous electrolyte secondary battery pertaining to another example is configured so that the crystal plane growth suppressor is a molybdenum compound. Note that in this example also, substances other than a molybdenum compound are not excluded as the crystal plane growth suppressor.

Hereinafter, examples for implementing the present invention are described with reference to the drawings.

Note that the following configuration is an example used for describing structures of the present invention and actions and effects exerted by the configuration in an easy-to-understand manner, and aside from essential elements thereof, the present invention is not limited to the example described below.

Embodiment

1. Outline of Structure of Positive Electrode Active Material Particle Powder

An outline of structure of positive electrode active material particle powder pertaining to the present embodiment is described below.

The positive electrode active material particle powder pertaining to the present embodiment is primarily composed of lithium (Li) and manganese (Mn), and is lithium manganese oxide having a cubic spinel structure of space group Fd-3m (stoichiometric composition: $LiMn_2O_4$). However, the positive electrode active material particle powder pertaining to the present embodiment is not limited to the stoichiometric composition above, and as long as the crystal structure is maintained, cations are deficient or excessive, or it is also possible to have a composition in which oxygen ions are deficient or excessive.

In the positive electrode active material particle powder pertaining to the present embodiment, a part of Mn may be partially substituted with cations of another metal element (for example, one or more metal elements selected from metal elements that can be substituted at the 16d site such as Li, Fe, Ni, Mg, Zn, Al, Co, Cr, Si, Ti, Sn, V, or Sb).

2. Crystal Plane Growth Suppression

The positive electrode active material particle powder pertaining to the present embodiment is formed into a desired shape by using a niobium (Nb) compound or a molybdenum (Mo) compound, for example, as a crystal plane growth suppressor. Added amounts of crystal plane growth suppressor such as Nb or Mo is preferably in a range of 0.001 to 0.012 in terms of molar ratio of metal substitute to Mn.

3. Ratio of Li/(Mn+Me)

In the positive electrode active material particle powder pertaining to the present embodiment, a ratio of Li/(Mn+Me) is preferably 0.5 or greater. This is because internal resistance can be reduced and crystal structure strengthened when compared to a stoichiometric composition of $LiMn_2O_4$, to further improve properties as a positive electrode active material of a non-aqueous electrolyte secondary battery with excellent high temperature properties.

For example, $Li(Li_xMn_{2-x})O_4$ (where x is a substitution amount) in which a part of Mn is substituted with Li, $Li(Li_xAl_yMn_{2-x-y})O_4$ (where x and y are substitution amounts) in which a part of Mn is substituted with Al and Li, and the like, can be used. Note that a desired Li/(Mn+Me) ratio is from 0.50 to 0.65, and more preferably from 0.53 to 0.63.

4. Crystal Planes

Figure 1A:
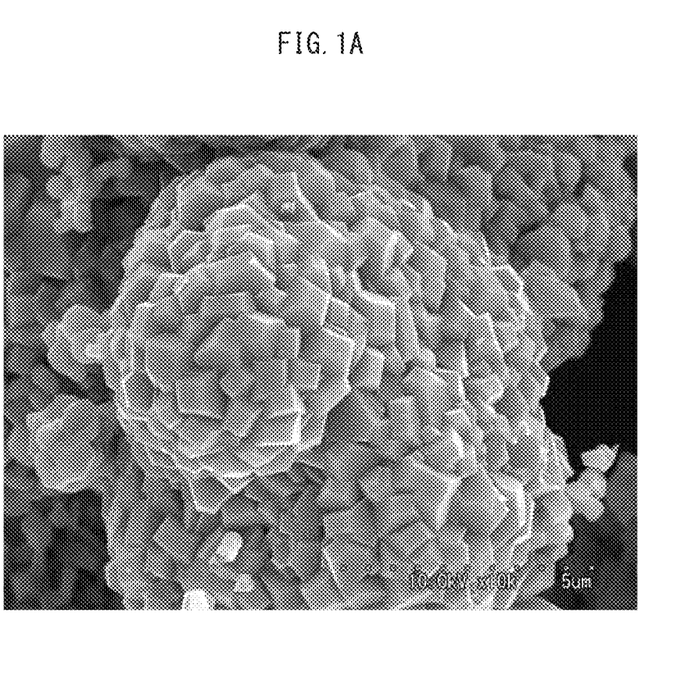
FIG. 1A is a scanning electron microscope (SEM) image showing outer appearance of aggregated secondary particles pertaining to example 1.
Figure 2A:
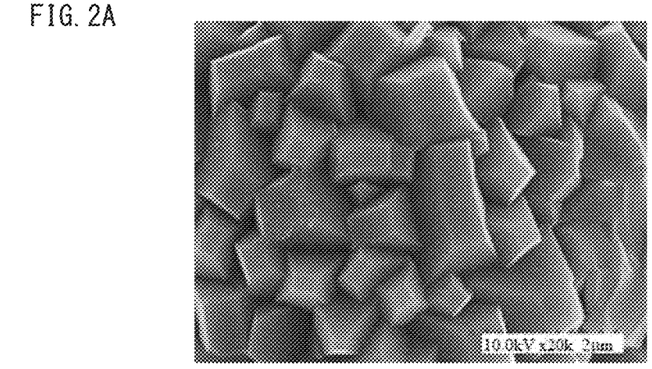
FIG. 2A is an enlargement of a portion of an SEM image of an outer appearance of aggregated secondary particles pertaining to example 1.
Figure 2B:
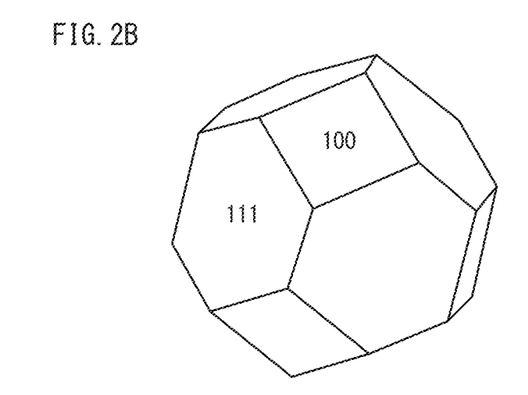
FIG. 2B schematically shows structure of a primary particle.

Primary particles of the positive electrode active material particle powder pertaining to the present embodiment have shapes as shown in FIG. 1A and FIG. 2A. That is, as shown in FIG. 2B, a polyhedron shape in which a (111) plane is adjacent to at least one (100) plane.

Note that such a crystal structure can be realized by suppressing growth of crystal planes other than (111) planes in the process of crystal growth. That is, such a structure can be realized by retaining a plane that disappears in the course of normal crystal growth.

Figure 1B:
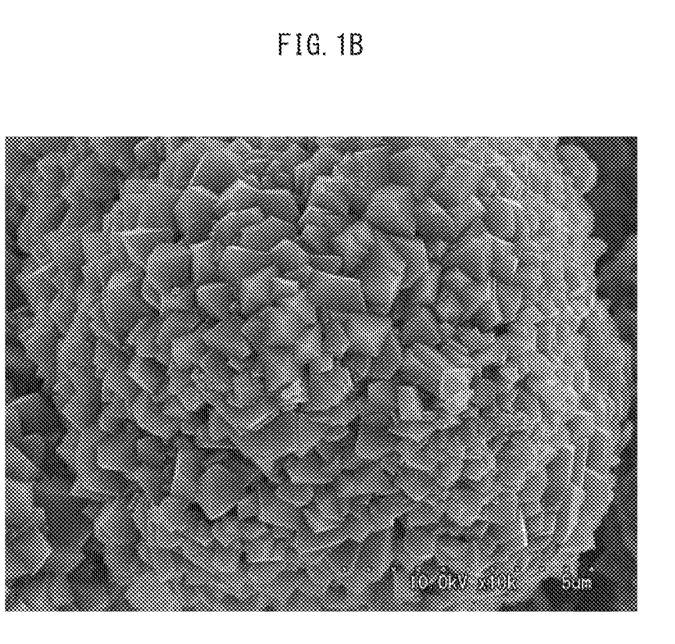
FIG. 1B is an SEM image showing outer appearance of aggregated secondary particles pertaining to comparative example 1.
Figure 3A:
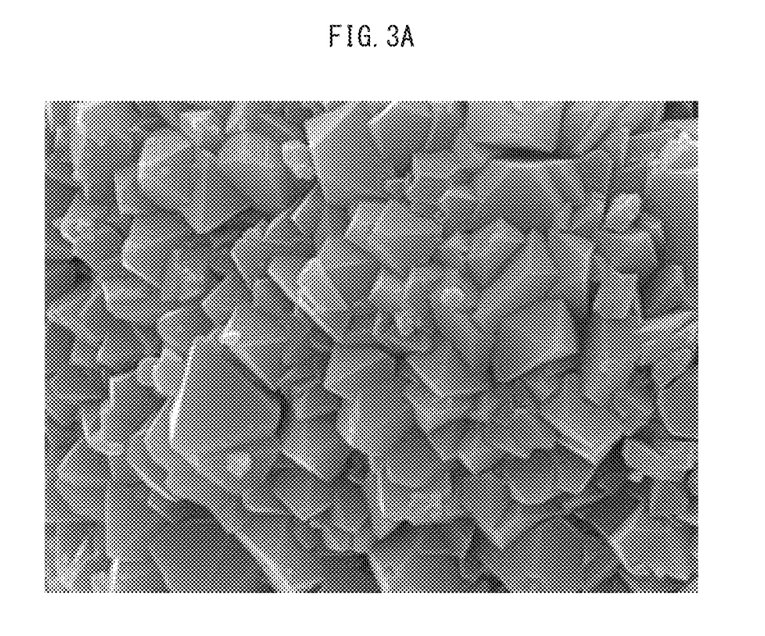
FIG. 3A is an enlargement of a portion of an SEM image of an outer appearance of aggregated secondary particles pertaining to comparative example 1 and FIG. 3B schematically shows structure of a primary particle.
Figure 3B:
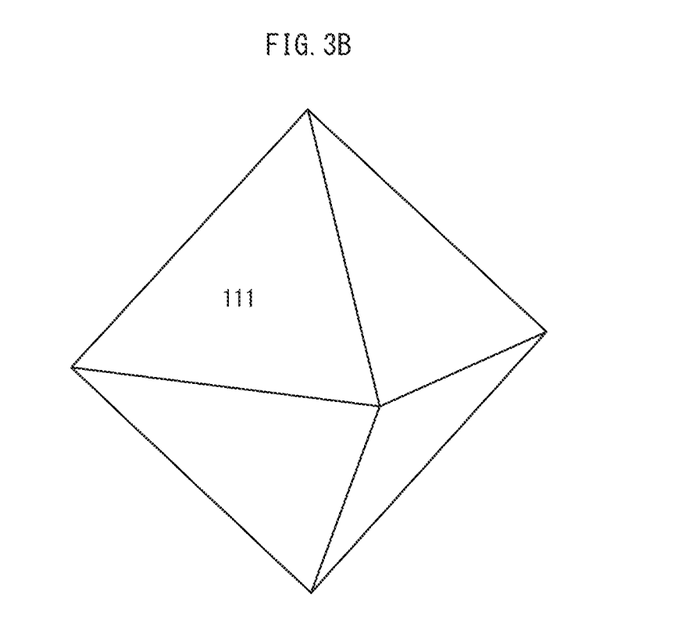
Figure 4:
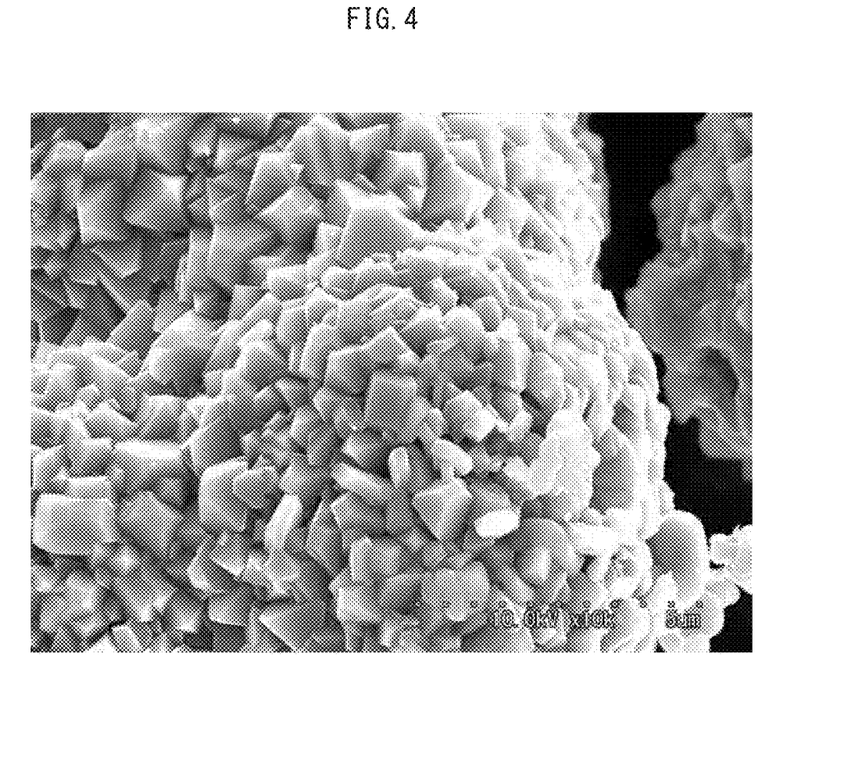
FIG. 4 is an SEM image of an outer appearance of aggregated secondary particles pertaining to comparative example 2.

On the other hand, as shown in FIG. 1B, FIG. 3A, and FIG. 4 where an amount of primary particles for which crystal growth is suppressed is less than 80%, octahedral particles that are the idiomorphic form of lithium manganese oxide become composed of (111) planes as a result of growth rate of (111) planes being slower than that of other crystal planes.

In the positive electrode active material particle powder pertaining to the present embodiment, as long as high temperature storage properties and high temperature cycle properties are in a range achieving excellence as a non-aqueous electrolyte secondary battery, primary particles having octahedral, particular, and other shapes may be included. It suffices that at least 80% of the number of primary particles visible on surfaces of aggregated secondary particles such as shown in FIG. 1A have a polyhedral shape in which each (111) plane is adjacent to at least one (100) plane, as shown in FIG. 2B.

5. Primary Particle Diameter and Secondary Particle (Aggregate Particle) Diameter Average primary particle diameter of positive electrode active material particle powder pertaining to the present embodiment is from 0.3 μm to 5 μm, preferably from 0.4 μm to 4 μm, and more preferably from 0.5 μm to 3 μm.

Average secondary particle diameter (D50) is from 4 μm to 20 μm. Excellent high temperature performance as a secondary battery can be obtained by controlling average secondary particle diameter to the above range.

According to the present embodiment, average primary particle diameter was observed using a scanning electron microscope with energy dispersive X-ray analyzer (SEM-EDX) (manufactured by Hitachi High-Technologies Corporation) and an average value read from an SEM image.

Further, average secondary particle diameter (D50) is a volume-based average particle diameter measured by a wet laser method using a laser particle size distribution measuring apparatus Microtrac HRA (manufactured by Nikkiso Co., Ltd.).

6. Specific Surface Area by BET Method

Specific surface area of a positive electrode active material particle powder pertaining to the embodiment according to the BET method is from 0.1 m$^2$/g to 1.2 m$^2$/g. When specific surface area according to the BET method is less than 0.1 m$^2$/g, growth of primary particles proceeds excessively, which is considered to lead to a decrease in stability. On the other hand, when specific surface area according to the BET method exceeds 1.2 m$^2$/g and primary particles that are too small (primary particle diameter is smaller than desired) become an aggregated secondary particle body, the aggregated secondary particle is unable to maintain a framework, and properties as a positive electrode active material become unstable.

Specific surface area according to the BET method is preferably from 0.15 m$^2$/g to 0.8 m$^2$/g, and more preferably from 0.2 m$^2$/g to 0.75 m$^2$/g.

7. Other Properties

A lattice constant of the positive electrode active material particle powder pertaining to the present embodiment is from 0.8185 nm to 0.8225 nm.

Figure 5:
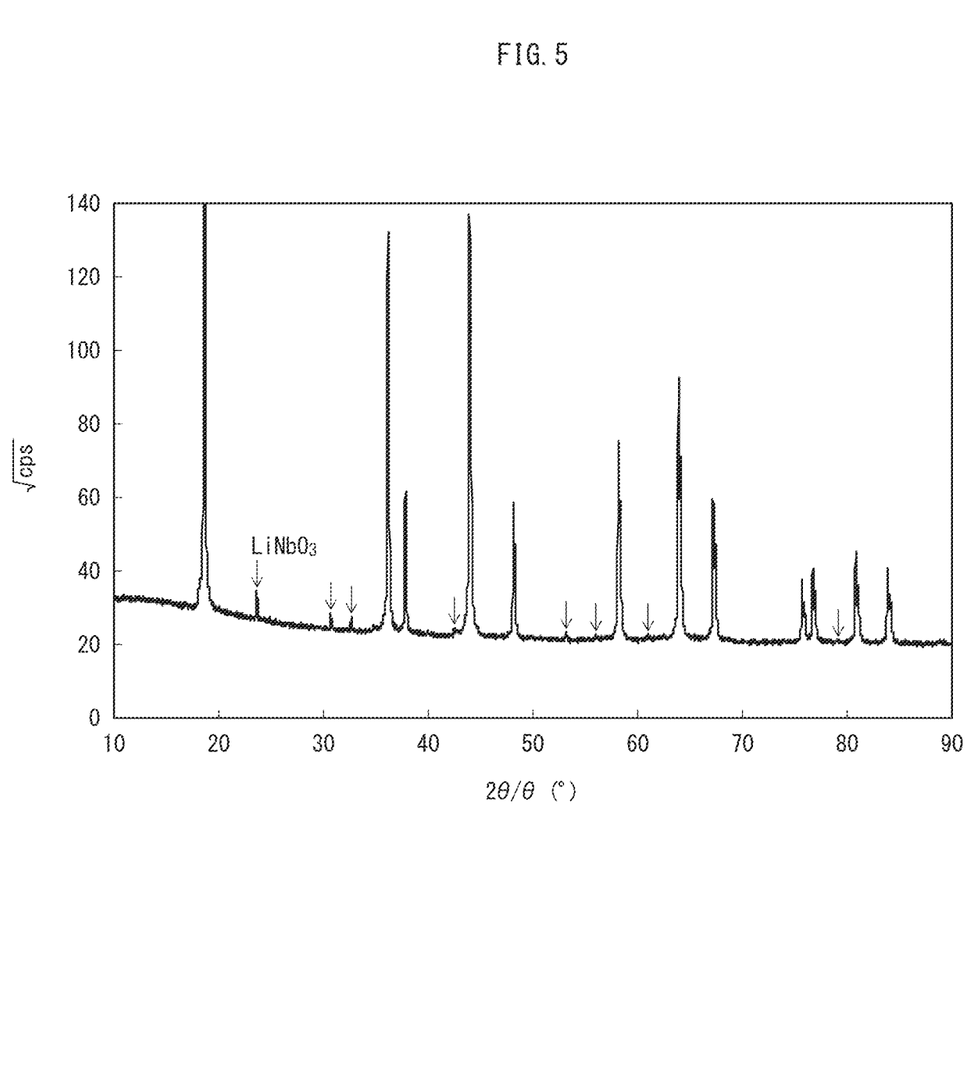
FIG. 5 shows an X-ray diffraction (XRD) of aggregated secondary particles pertaining to example 1.

Further, as shown in FIG. 5, for example, in X-ray diffraction (XRD) of the positive electrode active material particle powder pertaining to the present embodiment, aside from lithium manganese oxide that can be indexed by Fd-3m, niobium as a crystal growth suppressor may exist, combined with Li, in a phase containing LiNbO$_3$.

For X-ray diffraction, measurement was carried out using SmartLab (manufactured by Rigaku Corporation) (source: CuKα), and measurement conditions were 10° to 90° in 2θ/θ by 0.02° steps (1.2 s hold scan) at 0.02° increments. Further, when obtaining lattice constant information, a standard powder of Si was used as an internal standard substance and calculation performed by using the Rietveld method.

8. Method of Producing Positive Electrode Active Material Particle Powder

A method of producing positive electrode active material particle powder pertaining to the present embodiment is described below, with reference to FIG. 6.

(i) First, a lithium compound, trimanganese tetroxide, and a crystal plane growth suppressor are mixed in a ball mill (step S1).

Figure 6:
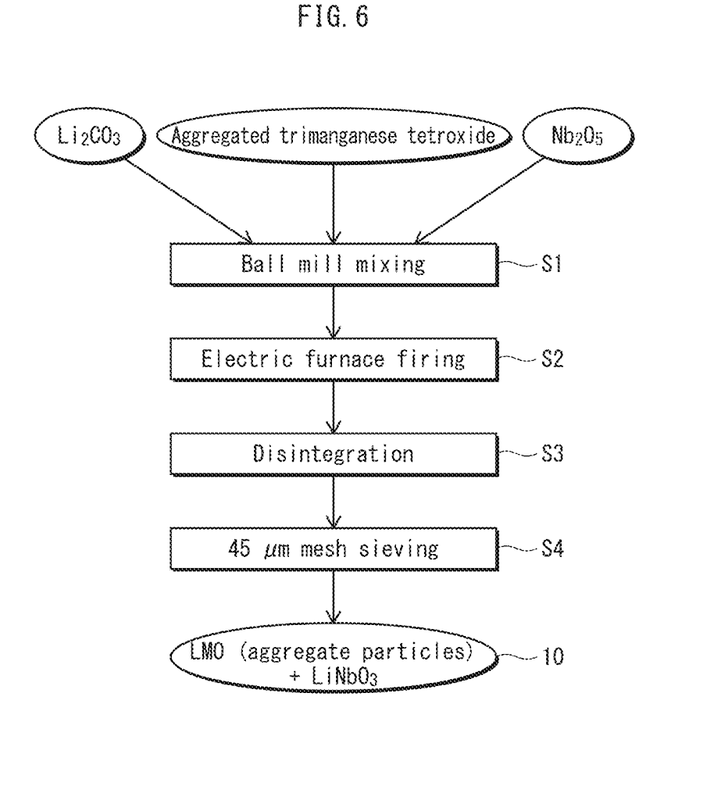
FIG. 6 schematically shows a method for producing aggregated secondary particles pertaining to an embodiment.

As shown in FIG. 6, according to the present embodiment, Li$_2$CO$_3$ is used as an example of a lithium compound.

Further, aggregated trimanganese tetroxide (Mn$_3$O$_4$) formed by aggregation of fine primary particles is used as trimanganese tetroxide as a manganese compound. The trimanganese tetroxide (Mn$_3$O$_4$) has a primary particle diameter according to crystallite size from 50 nm to 150 nm, preferably from 60 nm to 140 nm, and preferably an average secondary particle diameter from 3 μm to 20 μm. This is because the primary particle diameter being too large or too small is considered to lead to deterioration of high temperature properties of lithium oxide, and the average secondary particle diameter being too small is considered to lead to deterioration of high temperature properties of lithium oxide. Further, when average secondary particle diameter is too large, reaction when combined with Li deteriorates, and as a result, it is considered to lead to instability in a crystal of lithium manganese oxide.

Note that crystallite size of trimanganese tetroxide was calculated by using the Rietveld method from powder X-ray diffraction. For X-ray diffraction, measurement was carried out using SmartLab (manufactured by Rigaku Corporation) (source: CuKα), and measurement conditions were 10° to 90° in 2θ/θ by 0.02° steps (1.2 s hold scan) at 0.02° increments.

According to the present embodiment, Nb$_2$O$_5$, a niobium compound, or MoO$_3$, a molybdenum compound, is used as an example of a crystal plane growth suppressor. However, aside from a niobium compound or molybdenum compound, any element or compound can be used as long as it functions as a crystal plane growth suppressor.

Here, the added amount of the niobium compound or molybdenum compound as the crystal plane growth suppressor is from 0.1 mol % to 1.2 mol % in terms of a metal element with respect to Mn. When the added amount of niobium compound, molybdenum compound, or the like is less than the above range, a function as the crystal plane growth suppressor is considered to be insufficient, and conversely, when the added amount is greater than the above range, it is considered that particles of excess metal element compound inhibit function of the battery using the positive electrode active material and become a resistance component. The added amount of the crystal plane growth suppressor according to the present invention is preferably from 0.2 mol % to 0.9 mol % in terms of metal element with respect to Mn.

(ii) Next, the mixture formed by mixing is fired in an oxidizing atmosphere (step S2). Firing temperature is from 700° C. to 950° C., and more preferably from 730° C. to 900° C.

(iii) Next, positive electrode active material particle powder obtained by firing is disintegrated (step S3), and passed through a sieve of a mesh with mesh openings of 45 μm (step S4), in order to obtain positive electrode active material particle powder 10 pertaining to the present embodiment.

In producing the positive electrode active material particle powder, it is also possible to mix substituted metal element compound together with the lithium compound, trimanganese tetroxide, and crystal plane growth suppressor. In this case, as the substituted metal element, at least one metal element other than Mn, able to substitute at the Mn(16d) site can be used. By using such a substituted metal element, it is possible to control charge/discharge capacity of a battery, and to further improve charge/discharge cycle and high temperature properties. As specific examples, Li, Fe, Ni, Mg, Zn, Al, Co, Cr, Si, Ti, Sn, V, Sb, and the like can be used as a substituted metal element.

Further, it is preferable that a substituted metal element is uniformly present inside the positive electrode active material particles (a uniform solid solution). In a case in which a metal element is unevenly distributed inside a particle, it is considered to deteriorate stability in a non-aqueous electrolyte secondary battery.

9. Non-Aqueous Electrolyte Secondary Battery

Configuration of a lithium ion secondary battery 100 according to the present embodiment, which is manufactured using the positive electrode active material particle powder described above, is described with reference to FIG. 7.

Figure 7:
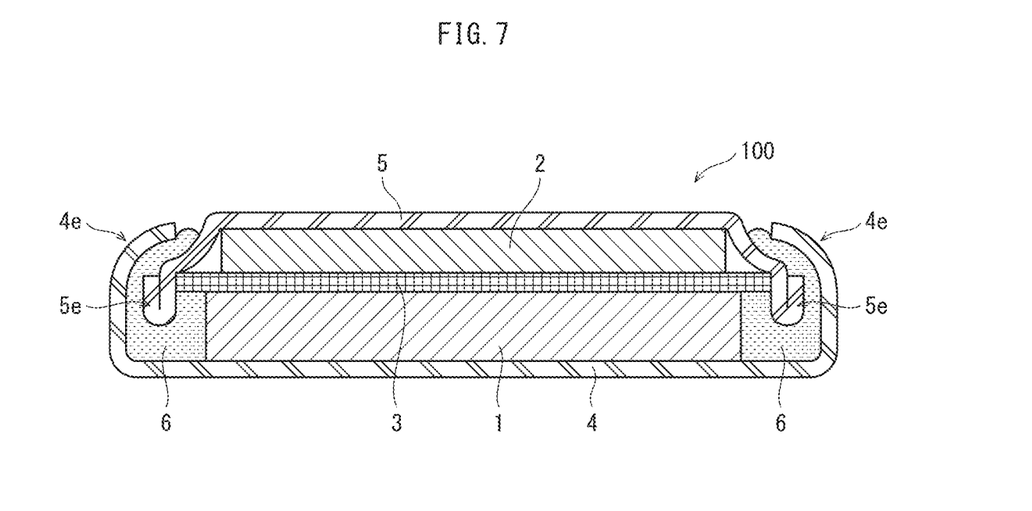
FIG. 7 is a schematic cross section showing configuration of a non-aqueous electrolyte secondary battery 100 pertaining to an embodiment.

The lithium ion secondary battery 100 pertaining to the present embodiment includes a tablet-like positive electrode element 1 and a negative electrode element 2 disposed so as to sandwich a separator 3, and is stored inside a package body composed of a positive electrode case 4 and a negative electrode case 5. The positive electrode case 4 is electrically connected to the positive electrode element 1, and the negative electrode case 5 is electrically connected to the negative electrode element 2. The positive electrode case 4 and the negative electrode case 5, in a state in which a gasket 6 is closely sandwiched therebetween, are caulked by outer edge portions 4e, 5e.

(i) Positive Electrode Element 1

The positive electrode element 1 is formed by using the positive electrode active material particle powder 10. A specific method of forming the positive electrode element 1 is omitted because it is possible to adopt a publicly-known method, but the positive electrode element 1 can be formed by adding and mixing a conductive agent and a binder to the positive electrode active material particle powder 10.

As the conductive agent, acetylene black, carbon black, graphite, and the like can be used, for example. Further, as the binder, polytetrafluoroethylene, polyvinylidene fluoride, and the like can be used.

(ii) Negative Electrode Element 2

The negative electrode element 2 is formed by using a negative electrode active material such as lithium metal, lithium/aluminium alloy, lithium/tin alloy, or graphite. In the lithium ion secondary battery 100 pertaining to the present embodiment, as one example, Li foil having a thickness of 300 μm is used.

(iii) Electrolytic Solution

As a solvent of the electrolytic solution, an organic solvent can be used that contains at least one of a combination of ethylene carbonate and diethyl carbonate, a carbonate such as propylene carbonate or dimethyl carbonate, and an ether such as dimethoxyethane.

As an electrolyte of the electrolytic solution, at least one of lithium hexafluorophosphate or a lithium salt such as lithium perchlorate or lithium tetrafluoroborate can be used, and this electrolyte is dissolved in the solvent.

According to the lithium ion secondary battery 100 pertaining to the present embodiment, as one example, 1 mol/L of $LiPF_6$ added to non-aqueous electrolyte solution (EC: DMC=1:2 ratio) is used.

As shown in FIG. 7, the lithium ion secondary battery 100 pertaining to the present embodiment is, for example, a 2032 size coin cell. An initial discharge capacity of the lithium ion secondary battery 100 is from 80 mAh/g to 120 mAh/g. In a case of an initial discharge capacity less than 80 mAh/g, battery capacity is too low for practical use. Further, in a case of an initial discharge capacity greater than 120 mAh/g, sufficient stability cannot be ensured for high temperature properties. Initial discharge capacity of the lithium ion secondary battery 100 is preferably from 85 mAh/g to 115 mAh/g.

Further, according to the lithium ion secondary battery 100 pertaining to the present embodiment, high temperature cycle capacity retention rate is at least 96.5%. A high temperature cycle capacity retention rate of at least 97% is preferable.

Further, the lithium ion secondary battery 100 pertaining to the present embodiment has a capacity recovery rate of at least 96%. A capacity recovery rate of at least 96.5% is preferable.

10. Effects

According to the lithium ion secondary battery 100 using the positive electrode active material particle powder 10 pertaining to the present embodiment, it is possible to improve high temperature properties.

In the method for producing the positive electrode active material particle powder, when the manganese compound, the lithium compound, and crystal plane growth suppressor are homogeneously mixed and fired at a temperature from 700° C. to 950° C. in an oxidizing atmosphere (for example, in air), and resulting particle powder is used in a non-aqueous electrolyte secondary battery, it is possible to obtain the positive electrode active material particle powder 10 capable of improving high temperature properties.

[Evaluation]

The following describes property evaluation results using specific working examples.

First, examples and comparative examples used for evaluation are described with reference to Table 1.

TABLE 1

| | Precursor | | | Mixed composition | | | Firing conditions | |
|---|---|---|---|---|---|---|---|---|
| | Mn compound | Average secondary particle diameter (μm) | Crystallite size (nm) | Li/(Mn + Me) | Substituted metal element Me | Crystal plane growth suppressor | Crystal plane growth suppressor added amount (mol %) | Air temperature (° C.) | Time (hours) |
| Example 1 | $Mn_3O_4$ | 10.5 | 92 | 0.58 | — | $Nb_2O_5$ | 0.60 | 820 | 3 |
| Example 2 | $Mn_3O_4$ | 10.5 | 92 | 0.58 | — | $Nb_2O_5$ | 0.30 | 820 | 3 |
| Example 3 | $Mn_3O_4$ | 10.5 | 92 | 0.56 | $Al(OH)_3$ | $Nb_2O_5$ | 0.55 | 810 | 3 |
| Example 4 | $Mn_3O_4$ | 10.5 | 92 | 0.55 | MgO | $Nb_2O_5$ | 0.55 | 810 | 3 |
| Example 5 | $Mn_3O_4$ | 10.5 | 92 | 0.59 | — | $MoO_3$ | 0.50 | 820 | 3 |
| Comparative example 1 | $Mn_3O_4$ | 10.5 | 92 | 0.58 | — | — | — | 820 | 3 |
| Comparative example 2 | $Mn_3O_4$ | 10.5 | 92 | 0.58 | — | $Nb_2O_5$ | 0.06 | 820 | 3 |

Example 1

The positive electrode active material particle powder pertaining to Example 1 was produced as follows.

As shown in Table 1, trimanganese tetroxide ($Mn_3O_4$) of crystallite size 92 nm and average secondary particle diameter 10.5 μm and lithium carbonate ($Li_2CO_3$) were mixed at a ratio of Li/Mn=0.58; Nb as a crystal plane growth suppressor was weighed and mixed as $Nb_2O_5$ at 0.60 mol % with respect to moles of Mn in trimanganese tetroxide; then fired in an air atmosphere at 820° C. for three hours to produce lithium manganese oxide particle powder.

As shown in FIG. 5, according to X-ray diffraction, in the resultant positive electrode active material particle powder, in addition to lithium manganese oxide that can be indexed by Fd-3m, Nb, which is the crystal plane growth suppressor, was present in $LiNbO_3$ phase. That is, the positive electrode active material particle powder pertaining to Example 1 had a composition of $Li_{1.10}Mn_{1.90}O_4 + LiNbO_3$.

Further, as a result of SEM image observation of the positive electrode active material particle powder pertaining to this example, as shown in FIG. 1A and FIG. 2A, it was confirmed that aggregated particles were composed of primary particles forming polyhedral shapes in which a (111) plane is adjacent to a (100) plane.

Further, the resultant positive electrode active material particle powder had an average primary particle diameter of approximately 0.8 μm and an average secondary particle diameter (D50) of 14.3 μm.

Next, using the positive electrode active material particle powder produced as described above, a lithium ion secondary battery was produced as follows.

By weight, 92% the positive electrode active material particle powder, 2.5% acetylene black and 2.5% graphite as a conductive agent, and 3% polyvinylidene fluoride dissolved in N-methylpyrrolidone as a binder were mixed, coated on Al metal foil and dried at 120° C. A sheet prepared in this way was punched out to a 14 mm diameter, then pressed at 1.5 ton/cm$^2$ for use as a positive electrode element.

Metal lithium having a thickness of 300 μm was punched out to a 16 mm diameter for use as a negative electrode element.

As an electrolytic solution, a solution prepared by mixing 1 mol/L LiPF$_6$ in EC and DMC at a volume ratio of 1:2 was used.

The lithium ion secondary battery according to this example is a 2032 type coin cell.

Example 2

As shown in Table 1, in the positive electrode active material particle powder pertaining to Example 2, the added amount of Nb was changed from the added amount used in Example 1. Production was otherwise identical.

Example 3

The positive electrode active material particle powder pertaining to Example 3 was produced as follows.

As shown in Table 1, trimanganese tetroxide (Mn$_3$O$_4$) of crystallite size 92 nm and average secondary particle diameter 10.5 μm, lithium carbonate (Li$_2$CO$_3$), and aluminium hydroxide (Al(OH)$_3$) were mixed at a ratio of Li/(Mn+Al)=0.56; Nb as a crystal plane growth suppressor was weighed and mixed as niobium oxide (Nb$_2$O$_5$) at 0.55 mol % with respect to moles of Mn in trimanganese tetroxide; then fired in an air atmosphere at 810° C. for three hours to produce lithium manganese oxide particle powder. That is, the positive electrode active material particle powder pertaining to Example 3 had a composition of Li$_{1.08}$Mn$_{1.85}$Al$_{0.07}$O$_4$+LiNbO$_3$.

Other elements of the lithium ion secondary battery were the same as in Examples 1 and 2.

Example 4

The positive electrode active material particle powder pertaining to Example 4 was produced as follows.

As shown in Table 1, trimanganese tetroxide (Mn$_3$O$_4$) of crystallite size 92 nm and average secondary particle diameter 10.5 μm, lithium carbonate (Li$_2$CO$_3$), and magnesium oxide (MgO) were mixed at a ratio of Li/(Mn+Mg)=0.55; Nb as a crystal plane growth suppressor was weighed and mixed as niobium oxide (Nb$_2$O$_5$) at 0.55 mol % with respect to moles of Mn in trimanganese tetroxide; then fired in an air atmosphere at 810° C. for three hours to produce lithium manganese oxide particle powder. That is, the positive electrode active material particle powder pertaining to Example 4 had a composition of Li$_{1.06}$Mn$_{1.89}$Mg$_{0.05}$O$_4$+LiNbO$_3$.

Other elements of the lithium ion secondary battery were the same as in Examples 1, 2, and 3.

Example 5

The positive electrode active material particle powder pertaining to Example 5 was produced as follows.

As shown in Table 1, trimanganese tetroxide (Mn$_3$O$_4$) of crystallite size 92 nm and average secondary particle diameter 10.5 μm, lithium carbonate (Li$_2$CO$_3$), molybdenum oxide (MoO$_3$) at 0.50% of Mo to moles of Mn in trimanganese tetroxide as a crystal plane growth suppressor were weighed and mixed at a ratio of Li/(Mn+Mo)=0.59; then fired in an air atmosphere at 820° C. for three hours to produce lithium manganese oxide particle powder. Composition of the positive electrode active material particle powder pertaining to Example 5 is Li$_{1.11}$Mn$_{1.89}$Mo$_{0.01}$O$_4$.

Other elements of the lithium ion secondary battery were the same as in Examples 1, 2, 3, and 4.

Figure 2C:
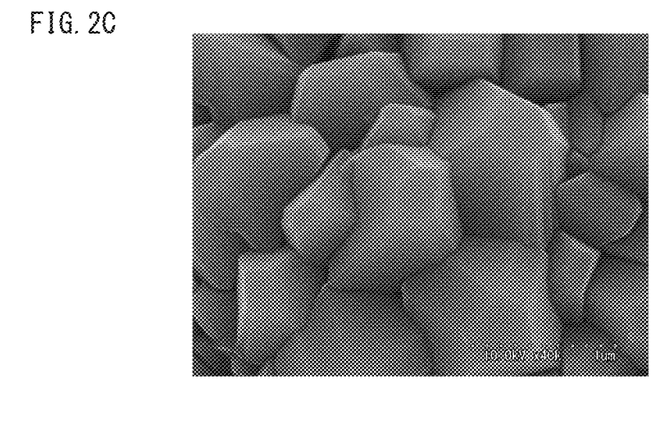
FIG. 2C is an enlargement of a portion of an SEM image of an outer appearance of aggregated secondary particles pertaining to example 5.
Figure 2D:
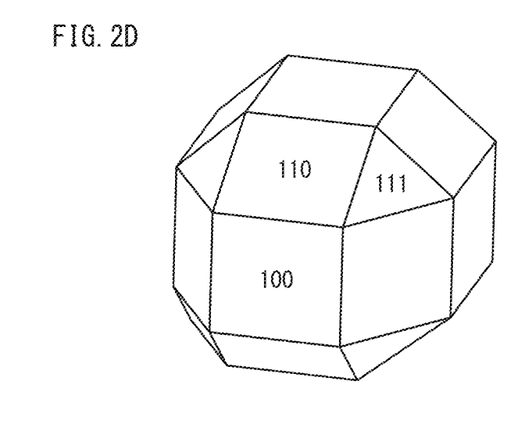
FIG. 2D schematically shows structure of a primary particle.

As a result of SEM image observation of the positive electrode active material particle powder pertaining to this example, as shown in FIG. 2C and FIG. 2D, it was confirmed that aggregated particles were composed of primary particles forming polyhedral shapes having a (100) plane and a (110) plane in addition to a (111) plane.

Comparative Example 1

As shown in Table 1, in production of the positive electrode active material particle powder pertaining to Comparative example 1, Nb, which is a crystal plane growth suppressor, is not added. Composition of the positive electrode active material particle powder pertaining to Comparative example 1 is Li$_{1.10}$Mn$_{1.90}$O$_4$.

Other production conditions are the same as in Example 1.

Comparative Example 2

As shown in Table 1, in production of the positive electrode active material particle powder pertaining to Comparative example 2, in contrast to Example 1, an added amount of Nb is 0.06 mol % with respect to moles of Mn in trimanganese tetroxide. Other production conditions are the same as in Example 1. Composition of the positive electrode active material particle powder pertaining to Comparative example 2 is Li$_{1.10}$Mn$_{1.90}$O$_4$+LiNbO$_3$.

As a result of SEM image observation of the positive electrode active material particle powder pertaining to Comparative example 2, it was confirmed that for primary particles exposed on surfaces of secondary particles, 55% of the primary particles formed polyhedral shapes in which a (111) plane is adjacent to at least one (100) plane.

Lithium ion secondary batteries produced as described above were evaluated as follows.

(Capacity Recovery Rate)

With respect to capacity recovery rate indicating high temperature properties, the lithium ion secondary batteries were charged to 4.3 V at a 0.1 C-rate of current density (constant current, constant voltage, (CC-CV)), then discharged to 3.0 V (constant current (CC)). Let the discharge capacity at that time be "a".

Subsequently, the lithium ion secondary batteries were charged again to 4.3 V at a 0.1 C-rate of current density (CC-CV), removed from a charge/discharge device, and left for six weeks in a constant temperature bath at 60° C. After six weeks the lithium ion secondary batteries were removed from the constant temperature bath, attached to a charge/discharge device, discharged at a 0.1 C-rate (CC) to 3.0 V, charged to 4.3 V (CC-CV), and discharged to 3.0 V (CC). Let the discharge capacity at that time be "b".

Then, (b/a×100) was taken as the capacity recovery rate (%). Results are shown in Table 2.

Example 2 has a value of 97.8%, Example 5 97.5%, and Examples 1, 3, 4 at least 98%. As shown in FIG. 8B, it can be seen that the high temperature cycle capacity retention rate of Example 1 is approximately 2% better than that of Comparative example 1.

(Discussion 3)

As shown in Table 2, with respect to rate properties, Comparative example 1 has a value of 94.1% and Comparative example 2 93.9%. In contrast, Examples 1, 2, 4 show higher values, and it is considered that Example 5, which has

TABLE 2

| | | Battery properties | | | |
|---|---|---|---|---|---|
| | Positive electrode active material composition | Initial discharge capacity (mAh/g) | Capacity recovery rate (%) | High temperature cycle capacity retention rate (%) | Rate property (%) |
| Example 1 | $Li_{1.10}Mn_{1.90}O_4$ | 105.9 | 97.9 | 98.2 | 94.9 |
| Example 2 | $Li_{1.10}Mn_{1.90}O_4$ | 105.4 | 97.6 | 97.8 | 94.2 |
| Example 3 | $Li_{1.08}Mn_{1.85}Al_{0.07}O_4$ | 104.8 | 98.8 | 98.0 | 94.1 |
| Example 4 | $Li_{1.06}Mn_{1.89}Mg_{0.05}O_4$ | 105.1 | 98.1 | 98.2 | 95.1 |
| Example 5 | $Li_{1.11}Mn_{1.89}Mo_{0.01}O_4$ | 106.3 | 97.1 | 97.5 | 96.1 |
| Comparative example 1 | $Li_{1.10}Mn_{1.90}O_4$ | 105.7 | 94.9 | 94.6 | 94.1 |
| Comparative example 2 | $Li_{1.10}Mn_{1.90}O_4$ | 105.8 | 95.5 | 95.5 | 93.9 |

(High Temperature Cycle Capacity Retention Rate)

For high temperature cycle capacity retention rate indicating high temperature properties, the lithium ion secondary batteries were charged from 3.0 V to 4.3 V at a C-rate of 0.5 (CC-CV), then discharged to 3.0 V at a C-rate of 1.0 (CC). Let the discharge capacity at that time be "c".

Subsequently, charging and discharging between 3.0 V and 4.3 V was repeated for 40 cycles (charging at a C-rate of 0.5 at CC-CV, discharging at a C-rate of 1.0 at CC), and discharge capacity at the 41st cycle is defined as "d".

Then, (d/c×100) was taken as the high temperature cycle retention rate (%). Results are shown in Table 2.

(Rate Property)

For rate properties, between 3.0 V and 4.3 V in a 25° C. environment, charging was performed at a C-rate of 0.1 (CC-CV) and when discharging at a C-rate of 0.1 or 10 (CC), discharge capacity at the C-rate of 0.1 is defined as "e" and discharge capacity at the C-rate of 10 is defined as "f".

Then (f/e×100) was taken as the rate property (%). These results are also shown in Table 2.

(Discussion 1)

First, as shown in Table 2, regarding capacity recovery rate, Comparative example 1 has a value of 94.9% and Comparative example 2 95.5%. In contrast, Example 1 has a value of 97.9%, Example 2 97.6%, Example 3 98.8%, Example 4 98.1%, and Example 5 97.1%, which are higher values than those of the comparative examples.

Figure 8A:
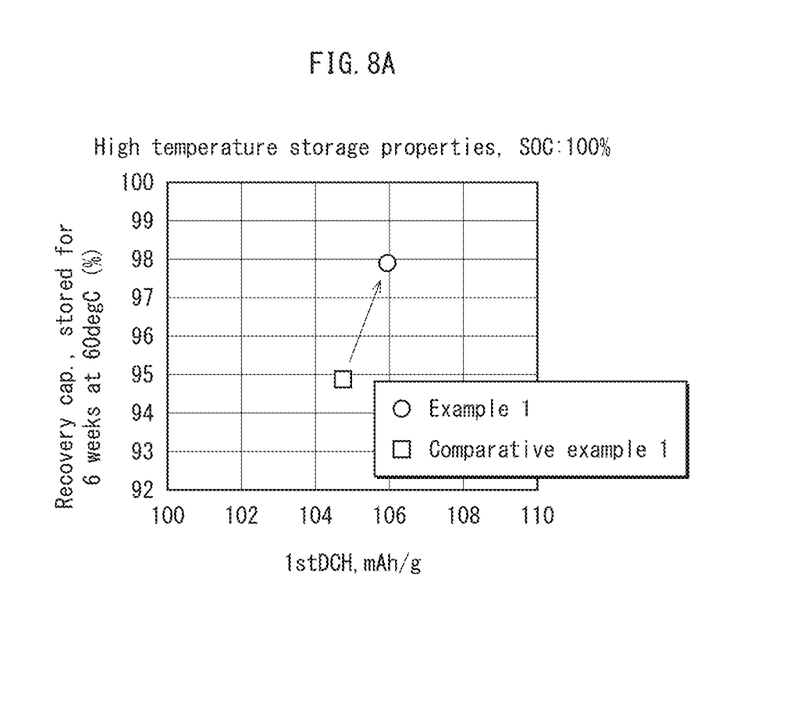
FIG. 8A shows high temperature storage properties of non-aqueous electrolyte secondary batteries pertaining to example 1 and comparative example 1.
Figure 8B:
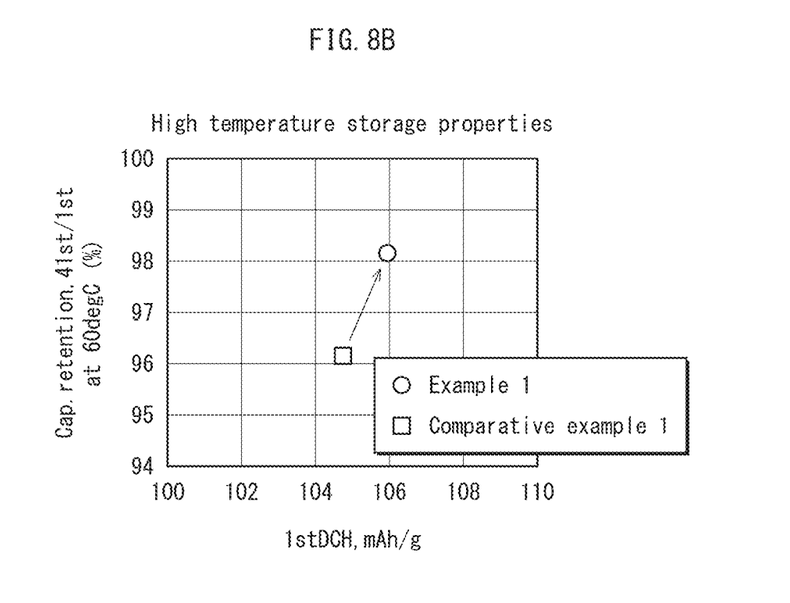
FIG. 8B shows high temperature cycle properties.

FIG. 8A shows capacity recovery rates of Example 1 and Comparative example 1. As shown in FIG. 8A, added Nb, which is a crystal plane growth suppressor, reduces area of a (111) plane, in which Mn dissolution is considered to be greater, and increases area of a (100) plane, which is considered to be strong against Mn dissolution, and therefore capacity recovery rate (storage property in high temperature) achieves an improvement of approximately 3%.

(Discussion 2)

As shown in Table 2, regarding high temperature cycle capacity retention rate, Comparative example 1 has a value of 94.6% and Comparative example 2 95.5%. In contrast, a large area of (110) plane having Li diffusion channels, exhibits a significantly higher rate property than Comparative example 1.

SUMMARY

Positive electrode active material particle powder for a non-aqueous electrolyte secondary battery pertaining to Examples 1-5 is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape in which each (111) plane thereof is adjacent to at least one (100) plane thereof.

Next, the relationship between surface energy and Mn dissolution is described with reference to FIG. 9A, FIG. 9B, and Table 3.

TABLE 3

| | Crystal plane | |
|---|---|---|
| | (100) | (111) |
| Surface energy γ (J/m²) | 0.96 | 1.29 |
| Mn dissolution Gibbs energy (kcal/mol) | 27.6 | −16.1 |

Note that this discussion is made in contrast with the prediction from the results of surface energy and Mn dissolution reaction Gibbs energy change from simulation performed by Thackeray, IMLB 2010 (International Meeting on Lithium Batteries, summer 2010).

Figure 9A:
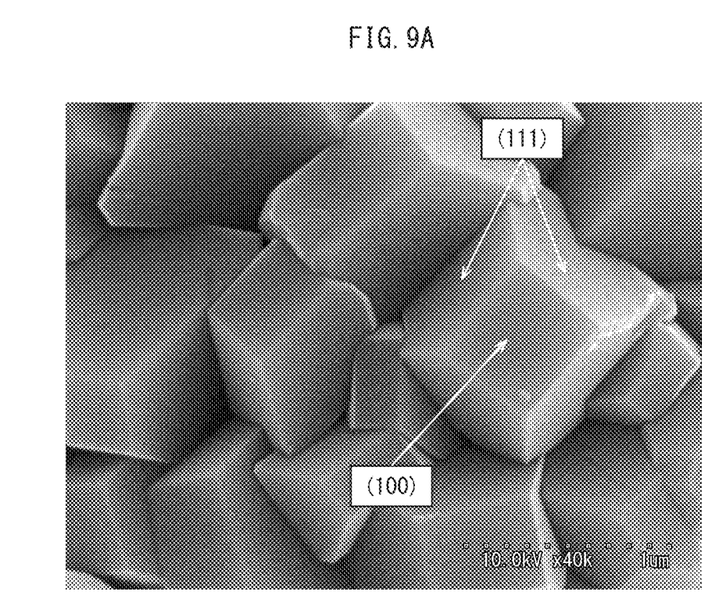
FIG. 9A is an SEM image showing an LMO crystal that has a (100) plane and (111) planes.
Figure 9B:
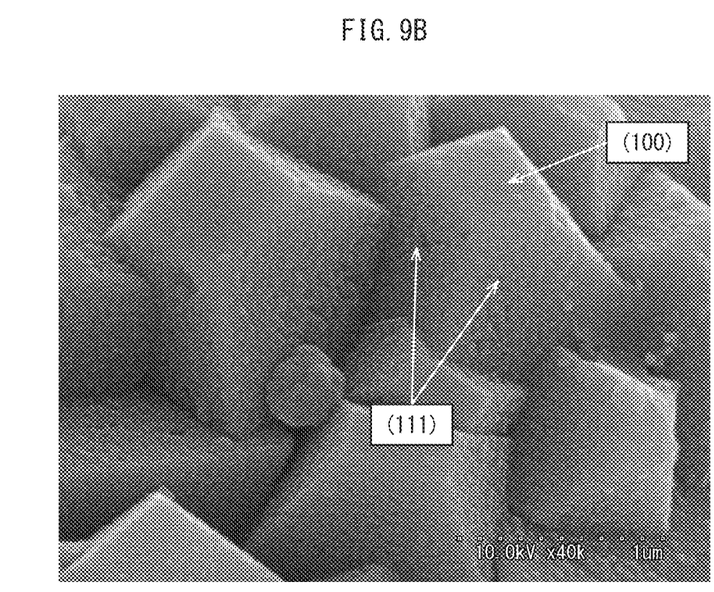
FIG. 9B is an SEM image after a corrosion (etching) test.

As shown in FIG. 9A, for a particle that has a (100) plane and (111) planes in an initial state, it can be observed that etching of the particle greatly corrodes the (111) planes, as shown in FIG. 9B. In contrast, corrosion of the (100) plane is not as great as that of the (111) planes.

Here, positive electrode active material particle powder shown in FIG. 9B was obtained by etching under the following conditions. Starting with 3 ml of a solution in which 1 mol/L of $LiPF_6$ was used as a solute and ethylene carbonate (EC) and diethyl carbonate (DEC) were mixed in a volume conversion ratio of 3:7, 2 g of positive electrode active material particle powder was mixed with the solution, the mixture was sealed and left for 1 week in an environment of 80° C. Subsequently, the mixture was filtered, powder was washed with dimethyl carbonate (DMC) then dried, in order to obtain etched positive electrode active material particle powder.

As shown in Table 3, surface energy γ of a (100) plane was 0.96 $J/m^2$, while that of a (111) plane was 1.29 $J/m^2$, the (111) plane having a greater surface energy. Further, Mn dissolution Gibbs energy of a (100) plane was 27.6 kcal/mol and Mn dissolution Gibbs energy of a (111) plane was −16.1 kcal/mol, indicating that dissolution of Mn is more likely to proceed in the (111) plane.

Based on the above results, a degree of corrosion progression in the SEM image shown in FIG. 9B is greater in (111) planes than (100) planes, which is consistent with Thackeray. From these results, when considering that low Mn dissolution at high temperatures and good storage properties at high temperatures are equivalent results, the above prediction is consistent with the results of battery properties found in the present embodiment.

[Other Configurations]

In Example 3, Li and Al were used as substituted metal elements, and Li and Mg were used as substituted metal elements in Example 4, but substituted metal elements are not limited to these examples. For example, a part of Mn may be substituted with one or more cations selected from metal elements capable of substituting at the 16d site, such as Fe, Ni, Zn, Co, Cr, Si, Ti, Sn, V, or Sb.

According to the Embodiment, Nb and Mo are taken as examples of crystal plane growth suppressor used in producing the positive electrode active material particle powder, but the present invention is not limited to these examples. Any material capable of suppressing growth of crystal planes other than (111) planes can be adopted.

Further, according to the Embodiment, a coin type of lithium ion secondary battery is used as an example of a non-aqueous electrolyte secondary battery, but the present invention is not limited to this example. For example, the present invention can be applied to cylindrical non-aqueous electrolyte secondary batteries, rectangular non-aqueous electrolyte secondary batteries, and the like. Further, the negative electrode element, the separator, the electrolytic solution, and the like may be changed appropriately.

INDUSTRIAL APPLICABILITY

The present invention is applicable to the realization of non-aqueous electrolyte secondary batteries having excellent high temperature properties.

REFERENCE SIGNS LIST

1. Positive electrode element
2. Negative electrode element
3. Separator
4. Positive electrode case
5. Negative electrode case
6. Gasket
10. Positive electrode active material particle powder
100. Lithium ion secondary battery

What is claimed is:

1. A method of producing positive electrode active material particle powder for a non-aqueous electrolyte secondary battery, the method comprising:
   mixing trimanganese tetroxide, a lithium compound, and a niobium compound or a molybdenum compound as a crystal plane growth suppressor to form a mixture; and
   firing the mixture in an oxidizing atmosphere at a temperature from 700° C. to 950° C.,
   wherein in X-ray diffraction analysis of the positive electrode active material particle powder, a cubic spinel phase composed of Li and Mn, and a phase of a compound of Nb and Li, or Mo and Li are present.

2. The method of claim 1, wherein
   the trimanganese tetroxide is composed of secondary particles, which are aggregates of primary particles, an average particle diameter (D50) of the secondary particles being from 3 μm to 20 μm, and crystallite size of the primary particles being from 50 nm to 150 nm.

3. The method of claim 1, wherein
   an amount of the crystal plane growth suppressor is from 0.3 mol % to 0.6 mol %.

4. The method of claim 1, wherein
   the positive electrode active material particle powder for a non-aqueous electrolyte secondary battery is a lithium manganate particle powder.

5. The method of claim 1, wherein
   in the mixing, the niobium compound or the molybdenum compound as the crystal plane growth suppressor reduces a ratio of a growth rate of planes other than a (111) plane to a growth rate of the (111) plane of lithium manganate particles having a cubic spinel structure.

6. The method of claim 1, wherein
   the positive electrode active material particle powder comprises a lithium manganese oxide particle powder having Li and Mn and a cubic spinel structure with an Fd-3m space group.

* * * * *